United States Patent [19]
Waldspurger

[11] 3,787,614
[45] Jan. 22, 1974

[54] TWO-TUBE COLOR TELEVISION CAMERA

[75] Inventor: Edward C. Waldspurger, Dayton, Ohio

[73] Assignee: Arvin Industries, Inc., Columbus, Ind.

[22] Filed: Apr. 20, 1972

[21] Appl. No.: 246,071

[52] U.S. Cl. .......................... 178/5.4 R, 178/5.4 ST
[51] Int. Cl. .......................... H04n 9/04
[58] Field of Search ........ 178/5.4 R, 5.4 ST, 5.4 TC

[56] References Cited

UNITED STATES PATENTS 3,553,356 1/1971 Groll .......................... 178/5.4 ST
3,591,706 7/1971 Parker-Smith et al. ........ 178/5.4 ST

*Primary Examiner*—Richard Murray
*Attorney, Agent, or Firm*—Lawrence B. Biebel et al.

[57] ABSTRACT

A color television camera uses two pick-up tubes with the full scene imaged on one tube and red and blue color components of the scene imaged in vertically aligned relation on the other tube. Standard scanning is employed for the one tube, and the same horizontal scan is used for the other tube, with its vertical scanning being changed on a line sequential basis between the red and blue images by causing a vertical scan deflection from one to the other of the two image areas.

5 Claims, 3 Drawing Figures

TWO-TUBE COLOR TELEVISION CAMERA

BACKGROUND OF THE INVENTION

This invention relates to video color cameras, and particularly to a simplified method and apparatus for the production of electronic video signals from a camera using only two camera or vidicon tubes to produce a compatible NTSC color composite signal. Various forms of single or two tube color cameras have been proposed in the past, for the purpose of simplifying the now widely used three tube camera, in which each of the three colors is generated from a separate camera tube to provide the color information for red, green and blue, respectively.

Typical of earlier two tube systems are those disclosed in U. S. Pat. No. 2,738,379, the modification shown in FIG. 5, and the system shown in U. S. Pat. No. 3,015,688. In either event, these systems require the use of a special strip-type optical filter on the face of (or in front of) at least one of the two tubes. That strip filter then provides a sequence of signals for different colors in order to generate the requisite chrominance signals. In the case of the system shown in U.S. Pat. No. 2,738,379, the signals from the camera tube embodying the striped filter may be employed to produce field sequential color transmission, such that only one color is involved in each field period.

In the arrangement disclosed in U.S. Pat. No. 3,015,688, the camera tube with the striped filter provides a composite signal covering green and red, and the second camera tube has an optical filter arrangement whereby it covers the blue light of the image. Thus, the tube in that system with the striped filter is used to make an essentially simultaneous transmission of red and green signal outputs, the two being interleaved in the sense that the scanning is transverse to the strip arrangements. Obviously, signal resolution in the color spectrum depends upon the number and size of the strips. A more coarse strip arrangement, lesser and wider strips, will result in lowered signal resolution.

A more recent two tube system is disclosed in U. S. Pat. No. 3,586,764. There, through the use of a special Kosters prism, together with appropriate red and blue filters, side-by-side red and blue images are focused on the second vidicon tube. A special horizontal scan arrangement is provided for the second vidicon, whereby one of the images is scanned horizontally in a normal direction, and the other is scanned in reverse direction since the corresponding image is inverted by the Kosters prism. The output from the second vidicon tube is processed both directly and through a one line delay, in a gating and sequencing control.

In such a system, there is an inherent problem of horizontal registration which is difficult to overcome, and which is considerably more noticeable than some reduction in vertical resolution. Reverse scanning of every other line requires the current change in the coil of the horizontal scan control to follow a curve of precisely opposite slope for every other line. This requires considerable coil trimming circuitry, and it is difficult not only to achieve linearity but even more so to maintain it. Any slight deviation will be readily exhibited on replay as misregistration of the horizontal traces which will in turn seriously degrade the color reproduction. Matrixing the signals in such a system is difficult, due to problems of displacement between the luminance and chroma signals. In fact the patent shows the color signals as independent outputs, not a matrixed N.T.S.C. signal. It is considerably easier to control voltage changes at lower frequency, and in a regular manner, as in the vertical scanning control.

SUMMARY OF THE INVENTION

In accordance with the present invention, an N.T.S.C. color signal is provided by a simple color camera employing only two ordinary vidicons of the monochromatic type. The optics of the camera includes a number of conventional beam splitting mirrors, one form of which is known as dichroic mirrors, which may also include appropriate color filter elements, or alternatively the color filters may be provided independently of the mirrors. The optical system produces simultaneously three different images of the scene being viewed. One image is in full color, and it is directed onto a first vidicon tube to provide a luminance signal of the scene, sometimes referred to as the Y signal.

The other two images are directed onto vertically separated areas of the second vidicon tube through appropriate filter elements such that one of the images represents the blue light portion of the scene, and the other image area represents the red light portion. It should be emphasized, that these image areas are vertically aligned but spaced from each other on the face of the second vidicon. The horizontal scanning drive for the two vidicons is synchronized such that a single horizontal scan is the same for all three images, at the usual frequency of 15.75 KHz. It should be noted that in the standard format this results in the usual time for a single line scan of 63.5 microseconds. The vertical deflection for the luminance vidicon is also standard, with the image being scanned in successive horizontal lines, preferably in the interlaced pattern such that a first field comprises 262 ½scan lines and a second field provides that same number of lines interlaced with the first field scan to provide the standard 525 line interlaced picture.

The vertical deflection system for the color vidicon of this camera is modified such that for each horizontal scan line of the luminance vidicon, one or the other of the two images on the second vidicon is scanned horizontally, i.e., in line sequential fashion. For example, synchronously with the first horizontal scan of the luminance vidicon there will be a scan of the blue image on the second vidicon, then during the second horizontal scan of the luminance vidicon there will be a horizontal scan of the red image on the color vidicon. This scanning of the color vidicon provides a horizontal resolution of one-half that of the luminance vidicon since the two images on the second vidicon are, in a practical case, one-half the size of the luminance image. Without further processing before display, chroma line flicker would result (commonly known as the venitian blind or water fall effect), due to line sequence scanning of the red and blue images. The line flicker is eliminated by storing the chroma line sequence signal format in a delay line, its time delay equal to one horizontal line, and adding this delayed signal to the real time line sequenced chroma signal. The result, is that vertical resolution is actually one-quarter that of the luminance vidicon. But vertical resolution in the standard format signal is normally about four times the horizontal resolution. In the present invention, the horizontal chroma luminance is still about equal to the vertical resolution.

Hence, a system having a luminance resolution of 4 MHz would have a chroma capability of 1 MHz. Normal broadcast chroma (red-blue) is only 500 KHz.

Processing to eliminate line flicker is accomplished by combining the output signal from the color vidicon with an inversion of the signal from the luminance vidicon. The resultant signal is passed into a circuit arrangement which directs the signal along two parallel paths. In one path, the signal passes through a delay line which has a time delay of 63.5 microseconds, the standard scan time for one horizontal line. In the other path, the signal passes directly through appropriate attenuator circuitry to provide the same attenuation of the signal as will result from passage of the signal through the delay line. The outputs of these two circuits are directed to an adding circuit, and the summation of these signals is combined with the signal from the luminance vidicon to provide the full color signal.

There are a number of advantages in this arrangement. The optics of the camera are simple and straightforward, employing conventional beam-splitting mirrors, which can either be of the type which reflects only certain colors, or used with conventional color filters in series with these mirrors, to provide the two images (blue and red) on the color vidicon. The optical path to the luminance vidicon is a straightforward system of optics. The vidicons can each be of a standard type, the color filtering being accomplished by simple passive optical elements ahead of these tubes. Only two of these vidicon tubes are required. Horizontal scanning is standard, and the vertical alignment of the color images assures good horizontal registration. The additional electronics required for the processing circuits is relatively simple and straightforward, the most significant components being the 63.5 microsecond delay line, and a divider circuit for the vertical drive of the color vidicon, generating a vertical drive stepped sawtooth wave form which causes scanning alternately in the vertically aligned blue and red image areas synchronously with the scanning of the luminance vidicon.

Accordingly, the primary object of this invention is to provide a novel color video camera employing only two vidicon tubes, preferably each of the standard monochromatic type, together with appropriate controls and processing circuits whereby a fully compatible N.T.S.C. color video signal is obtained from the camera, with a resolution which is satisfactory for broadcast transmission; to provide such a color camera in which the external light color filtering is achieved in the optical system ahead of the vidicon tubes, to provide such a camera wherein two separate color images are formed vertically aligned on the color vidicon tubes, and these are scanned in line sequential fashion, alternately and synchronously with the scanning of the full color or luminance image on the other vidicon tube of the camera.

Other objects and advantages of this invention will be apparent from the following description, the accompanying drawings and the appended claims.

DESCRIPTION OF THE PREFERRED EMBODIMENT

Figure 1:
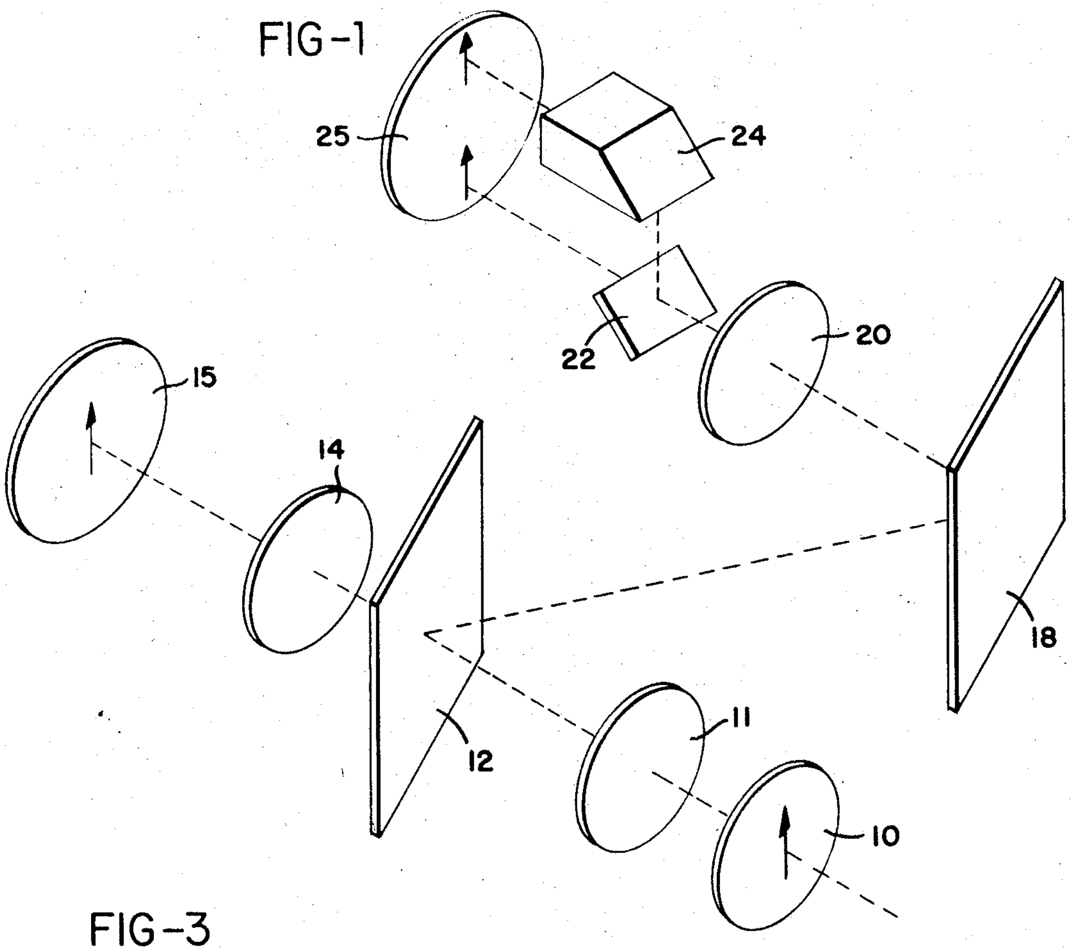
FIG. 1 is a schematic diagram showing the optical arrangement of a typical color video camera constructed according to the invention.

The optical system as shown in FIG. 1 takes the image transmitted through a standard TV-Cine lens 10 (for example 25mm. focal length) and splits it to supply full field, chrometrically separated images to two vidicons.

The subject information (represented by an arrow) comes through the lens 10 to a further lens 11 which is in the focal plane of lens 10 and covers the full format size which would be in its focal plane. The image transmitted through lens 11 is partially transmitted and partially reflected by a neutral beam splitter 12. The transmitted portion is refocused by lens 14 to a new focal plane in which one vidicon tube 15 is placed. The image on this vidicon covers the same field of view and is exactly the same size as the image would be if the vidicon were at lens 11, the normally used TV focal plane. This image is in full color, but reduced in intensity because of the beam splitter and other losses in the lens system. A color filter (not shown) can be inserted in front of vidicon tube 15 to trim the color information to match the spectral response of the vidicon to the human color response. This would be the luminance or "Y" signal in the camera.

The beam reflected from splitter 12 is directed to and reflected from a mirror 18 which is parallel to beam splitter 12. This mirror can be a front surface mirror or a beam-splitting type which will transmit the infrared and/or ultraviolet portions of the spectrum, thus rejecting these spurious signals. The beam reflected from mirror 18 is refocused by a lens 20 to form an image at a new focal plane in which the second vidicon 25 is placed. However, before the image reaches this vidicon it is geometrically and chromatically split. A 45° angle dichroic beam splitter 22 transmits the yellow-red part of the spectrum and reflects the blue. The reflected blue portion is directed to the 45° angle face of a prism 24 from which it is reflected and the image transmitted through the prism to the vidicon 25.

Color trim filters (not shown) may be inserted before the vidicon face if further color purity is necessary. The purpose of using a prism 24 at this place rather than a mirror is that is is necessary to compensate for the longer beam-path of this blue image. Both the red and blue images must be in exactly the same focal plane on vidicon 25 so a higher index of refraction material (1.5) is inserted into the blue path to move back the focal plane in this path to the same position as that of the transmitted red image. The positions of beam-splitting mirrors 12 and 18 determine the path length of the beam transmitted through lens 20 and thus the size of the images at vidicon tube 25. Because it is necessary to form two images covering the same angle of view as the single image on vidicon tube 15 lengths are preferably chosen such that each of two images at tube 25 is exactly one-half as large the image at tube 15. Thus, the optical system will deliver through a single camera lens through separate images to two vidicons.

The luminous vidicon will have a single full size, full color image and the chroma vidicon two separate 1/2 size images, one in red and the other in blue.

Figure 2:
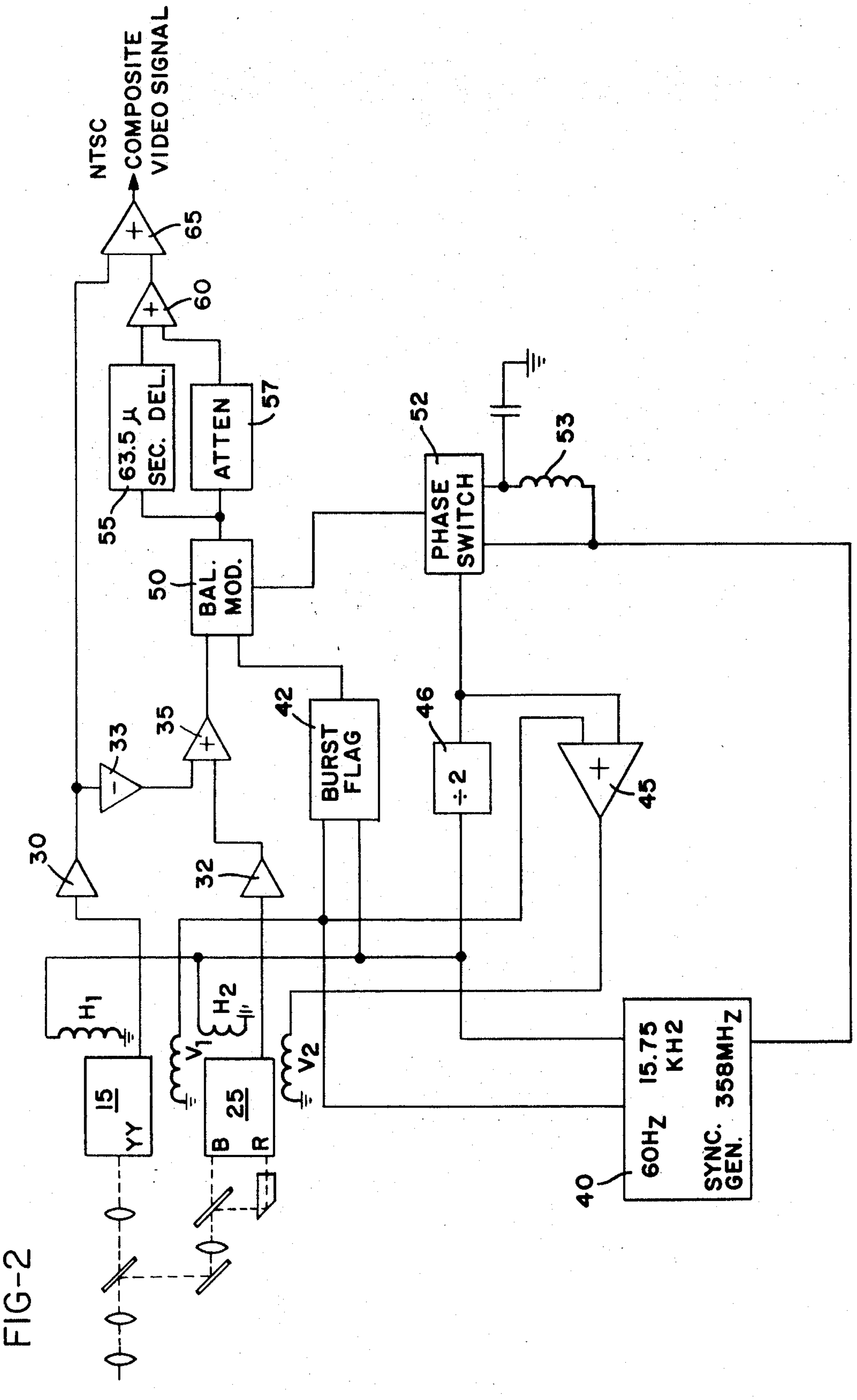
FIG. 2 is a block diagram showing the manner in which the scanning of the two vidicon tubes is controlled, and the manner in which the resultant signals are processed.

Referring to FIG. 2 the horizontal and vertical deflection coils for the vidicon tube 15 are designated respectively by the reference legend Hi and Vi; similarly the horizontal and vertical deflection coils for the vidicon tube 25 are designated H2 and V2. The signal output from vidicon 15 is directed to a preamplifier 30, and the signal from the vidicon 25 is directed to a separate preamplifier 32. From the output of the preamplifier 30, the luminance signal is passed through an inverter circuit 33, and thence to an adder circuit 35 which also receives the output of preamplifier 32. In this manner, the output of the adder circuit 35 represents a composite of the colors of the scene viewed by the camera, as is well known in the art, as (R–Y), and (B–Y).

The signals for controlling the synchronous scanning of the two vidicon tubes 15 and 25, and also for controlling the addition of the chrominance signal to the luminance signal from the preamplifier 30, are all derived from a master sync generator circuit 40 which is of standard construction, and provides a 3.58 MHz subcarrier, a 15.75 KHz horizontal drive or deflection signal, and a 60 Hz vertical deflection signal. The horizontal deflection signal is applied to both of the horizontal deflection coils H1 and H2 such that the electron beams in both vidicon tubes scan horizontally in synchronism. The 60 Hz vertical deflection signal is applied directly to the vertical deflection coil V1 of the vidicon tube 15, and it is also supplied to the burst flag control circuit 42 and to an adder circuit 45 whose output is applied to the vertical deflection coil V2 of the second vidicon tube 25. The other input of the adder circuit 45 is obtained from the output of a dividing flip-flop 46 which had an input from the horizontal drive circuit. Thus, the other input to the adder circuit 45 is at one-half the horizontal frequency, or 7.875 KHz.

Figure 3:
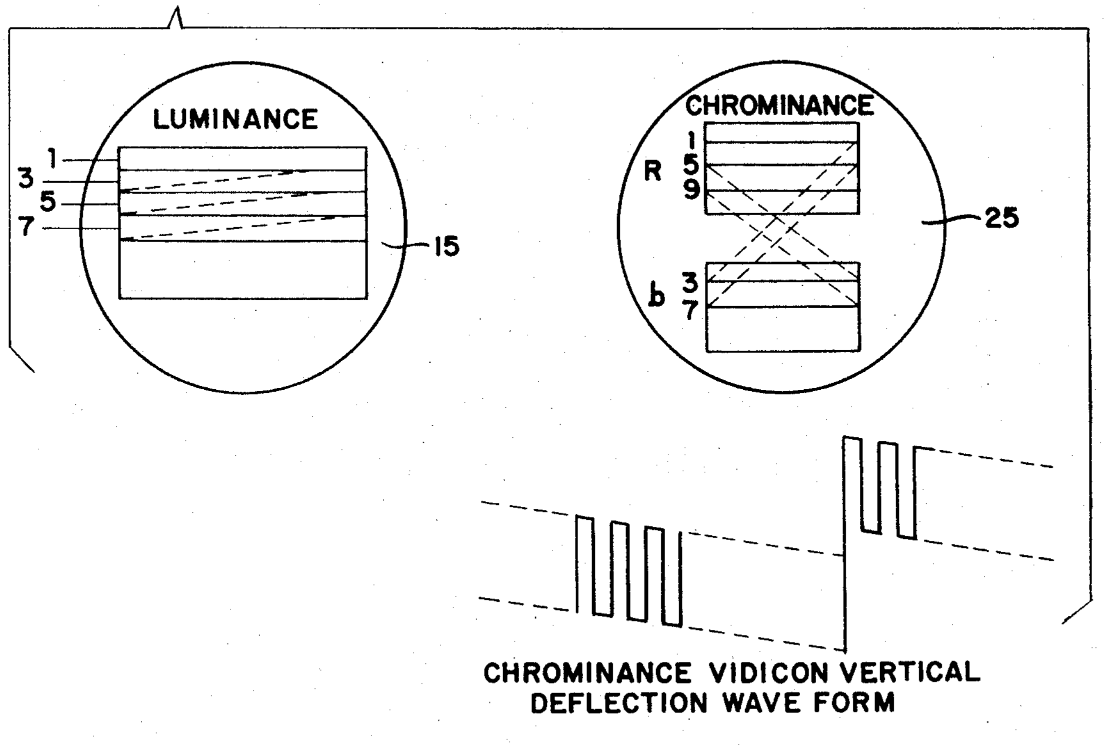
FIG. 3 is a view showing the image face of the two vidicon tubes of the camera, illustrating the sequence in which the images are scanned, and showing the vertical deflection waveform for the chrominance vidicon tube.

The output from the adder circuit is a modification of the ordinary 60 Hz sawtooth vertical deflection signal, with first portions of the sawtooth wave form at a higher amplitude and intermediate portions at a lower amplitude. This causes the electron beam to scan first one horizontal line across one color image area (for example the blue image shown in FIG. 3) and then to scan once horizontally in the other image area. The sequence for the two vidicon tubes is indicated by numbered reference lines in FIG. 3, illustrating the first four scans in one field on the Y or luminance image, and the sequence of the same first four scan lines on the blue and red image areas respectively of the chrominance vidicon tube.

The output of the adder circuit 35 is directed to a modulator circuit 50 which also receives a signal from the burst flag generator in order to locate the color burst signal properly on the backporch of the horizontal sync signal as is required in the N.T.S.C. color video signal. The 3.58 MHz color carrier signal is applied to a phase switching circuit 52 both directly and through a phase shifting network 53. The switching of the phase switch 52 is controlled by the output of the flip-flop divider circuit 46, whereby either the direct or the 90° phase shifted color carrier signal appears alternately at the output of the phase switch circuit. This is applied to the balanced modulator 50, which double sideband modulates the composite color signal which appears at the output of the modulator circuit 50.

This output signal is divided into two paths. One path includes a 63.5 microsecond delay line 55 which delays the composite color signal for a period equal to the length of one horizontal scan line. The other path includes an attenuator circuit 57 which introduces the same attenuation as occurs when the signal passes through the delay line 55. The result is that the attenuated color signal appears essentially undelayed, and the output from the delay line 55 appears delayed by one horizontal scan. These outputs are matrixed in an adder circuit 60 to produce the usual good nature double side band chroma signal.

The output of the adder circuit 60 thus represents the summation of the color signal for a line which is being scanned by the two vidicon tubes, and also the color signal from the line immediately previously scanned. These two signals are combined in a final adder circuit 65, and the output from that circuit is a color composite video signal compatible with the NTSC standard.

Considering further the scanning sequence of the two vidicon tubes, the first horizontal scan line in the chrominance vidicon is across the blue image. The signal applied to the balance modulator 50 is the B–Y signal, to which the 3.58 MHz color burst is added from the phase switch 52, in the same phase as generated. This signal then passes through the attenuator 57 and also into the delay line 55. For the first scan line the output from the adder circuit 60 will be a chrominance signal with only B–Y resolution.

The next or second scan line provides an input to the balance modulator 50 which represents R–Y. The color carrier signal will be added from the phase shifting network 53, through the phase switch 52, the the resultant R–Y signal passing the attenuator 57 will be combined in adder circuit 60 with the delayed B–Y signal from the previous line, the summation of the two providing the chrominance signal for the second horizontal scan line. In similar fashion, for the third horizontal scan the output of the adder circuit 60 will be a combination of (B–Y) and $(R\text{–}Y)_2$, the delayed signal from the second scan which was of red image on the chrominance vidicon tube 25.

The apparent resolution of a color picture reproduced from the color signal has been found to be completely adequate as to faithful color reproduction and picture clarity. From the output of the adder circuit 65, the color composite video signal may be handled in the same manner as the conventional composite signal which presently is in widespread use.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. In a color video camera of the type employing a single color pick-up tube, the improvement comprising optical means receiving a light image of a scene and dividing it into two vertically aligned images, optical filters included in said optical means and causing the two resultant images to contain predominantly two different component colors of the scene, scanning control means for said pick-up tube causing the images to be scanned horizontally at a standard rate and causing the scan to alternate vertically between the two images after each horizontal scan as the scanning proceeds in a vertical direction.

2. A color video camera system comprising
first and second pick-up tubes;
an optical system including first means for directing one image of a scene onto said first tube; second means for directing two other images of the same scene aligned one above the other onto said second tube, and optical filters associated with said second means forming the two other images as different color images;
scanning drive means operative to scan said tubes in synchronism and causing line sequential horizontal scanning of said two other images to produce a chroma output signal from said second tube which contains chroma information alternately from the two other images and to produce a luminance signal from said first tube,
circuit means combining said signal from said second tube with an inversion of said luminance signal and producing a color composite signal,
delay means receiving said color composite signal and operating to introduce a delay equal to one horizontal scan to produce a delayed composite signal,
and means combining the color composite signal with the delayed composite signal and with the luminance signal to form a complete color video signal.

3. A color video camera comprising
an optical system and vidicon tube scanning means receiving three separate images of a scene from said optical system,
one of said images being an essentially unmodified representation of the scene and the other two images being of different component colors in the scene and being arranged one above the other,
said scanning means being constructed and arranged to scan said one image in a succession of lines and simultaneously and synchronously to scan said other component color images alternately in succession in line sequential fashion whereby a luminance signal is obtained for the full image and component color signals are obtained for each of the component color images,
processing means including a delay circuit receiving said color signals and providing corresponding direct color component signals and delayed color component signals lagging the direct signals by one scan line and combining the direct and delayed color component signals to produce a composite color output signal which is precisely registered to the scan of said one image.

4. A color video camera comprising
an optical system and two pick-up tube scanning means receiving three separate images of a scene from said optical system,
one of said images being an essentially unmodified representation of the scene on one of said tubes and the other two images being of different component colors in the scene and being aligned vertically of one another on the other pick-up tube,
said pick-up tubes each having horizontal and vertical deflection controls for scanning the images,
horizontal scan drive means connected to drive the horizontal deflection control of each of said pick-up tubes simultaneously and in phase,
vertical scan drive means connected to drive the vertical deflection control of each of said tubes simultaneously and including a superimposed deflection signal arranged to cause alternation of the scan on said other pick-up tube between the two images on a line sequential basis,
scanning means being constructed and arranged to scan said one image in a succession of lines and simultaneously and synchronously to scan said other component color images alternately in succession in line sequential fashion whereby a luminance signal is obtained for the full image and component color signals are obtained for each of the component color images,
processing means including a delay circuit receiving color signals from said other pick-up tube and providing corresponding direct color component signals and delayed color component signals lagging the direct signals by one scan line and combining the direct and delayed color component signals to produce a composite color output signal which is precisely registered to the scan of the one image on said one pick-up tube.

5. The method of producing a standard color composite video signal using two pick-up tubes, comprising the steps of:

*a.* forming a full image of a scene to be reproduced on one of said tubes,

*b.* forming two separate color component images of the same scene in vertically aligned relation on the second tube,

*c.* driving the scanning system of both said tubes in synchronism and scanning the color component images on the second tube in line sequential fashion whereby for each signal representing a single horizontal scan on the first tube there is a corresponding horizontal scan output signal from the second tube for one or the other of the color component images,

*d.* combining the output of said second tube with an inversion of the output from the first tube,

*e.* storing the combined color signal for a time period equal to one horizontal scan line,

*f.* adding the combined color signal to the stored color signal for the previous scan line, and

*g.* adding the combined delayed and undelayed color signal to the output of the first tube to form a complete color composite video signal.

* * * * *